US008667485B2

(12) United States Patent
Lee

(10) Patent No.: US 8,667,485 B2
(45) Date of Patent: Mar. 4, 2014

(54) METHOD AND SYSTEM FOR EXECUTING A FILE STORED IN A HIDDEN STORAGE AREA OF A STORAGE DEVICE

(75) Inventor: Chien-Fu Lee, Yulin County (TW)

(73) Assignee: Phison Electronics Corp., Miaoli (TW)

( * ) Notice: Subject to any disclaimer, the term of this patent is extended or adjusted under 35 U.S.C. 154(b) by 1173 days.

(21) Appl. No.: 12/542,167

(22) Filed: Aug. 17, 2009

(65) Prior Publication Data

US 2010/0325180 A1 Dec. 23, 2010

(30) Foreign Application Priority Data

Jun. 23, 2009 (TW) .............................. 98121008 A

(51) Int. Cl.
*G06F 9/44* (2006.01)
*G06F 9/445* (2006.01)

(52) U.S. Cl.
USPC .......................... 717/174; 717/162; 717/168

(58) Field of Classification Search
None
See application file for complete search history.

(56) References Cited

U.S. PATENT DOCUMENTS

| 6,778,974 | B2 * | 8/2004 | Moore et al. | 711/100 |
|---|---|---|---|---|
| 7,493,484 | B2 * | 2/2009 | Lee | 713/2 |
| 7,543,309 | B2 * | 6/2009 | Forin et al. | 717/162 |
| 7,913,248 | B1 * | 3/2011 | Lynch et al. | 717/174 |
| 8,069,324 | B2 * | 11/2011 | Moon et al. | 711/162 |
| 8,090,927 | B2 * | 1/2012 | Lee | 711/173 |
| 8,276,188 | B2 * | 9/2012 | Chou et al. | 726/2 |
| 8,434,099 | B2 * | 4/2013 | Forin et al. | 717/162 |
| 2002/0083318 | A1 * | 6/2002 | Larose | 713/164 |
| 2003/0225971 | A1 * | 12/2003 | Oishi et al. | 711/115 |
| 2004/0172526 | A1 * | 9/2004 | Tann et al. | 713/2 |

(Continued)

FOREIGN PATENT DOCUMENTS

| CN | 101286121 | 10/2008 |
|---|---|---|
| JP | 2002507307 | 3/2002 |

(Continued)

OTHER PUBLICATIONS

Handschuh et al., "Securing Flash Technology", 2007 IEEE, pp. 1-17; <http://ieeexplore.ieee.org/stamp/stamp.jsp?tp=&arnumber=4318980>.*

(Continued)

*Primary Examiner* — Thuy Dao
*Assistant Examiner* — Ben C Wang
(74) *Attorney, Agent, or Firm* — J.C. Patents

(57) ABSTRACT

A file executing method for executing a computer executable code set stored in a hidden storage area of a storage device in an operating system of a computer host is provided. The method includes connecting the storage device to the computer host and providing a loader for managing the computer executable code set. The method also includes running the loader in a main memory of the computer host, requesting the operating system to allocate a first address segment in the main memory for running the loader, loading the computer executable code set from the hidden storage area into the first address segment by using the loader, transforming the computer executable code set into an executable content of the operation system by using the loader and storing the executable content into the first address segment; and establishing a derivative execution procedure by using the loader to execute the executable content.

18 Claims, 6 Drawing Sheets

(56) References Cited

U.S. PATENT DOCUMENTS

| | | | |
|---|---|---|---|
| 2005/0010918 A1* | 1/2005 | Childs et al. | 717/174 |
| 2005/0015540 A1* | 1/2005 | Tsai et al. | 711/103 |
| 2005/0144464 A1* | 6/2005 | Chiu et al. | 713/186 |
| 2005/0209991 A1* | 9/2005 | Rogers et al. | 707/1 |
| 2005/0251799 A1* | 11/2005 | Wang | 717/168 |
| 2006/0294356 A1* | 12/2006 | Kumar et al. | 713/2 |
| 2007/0028224 A1* | 2/2007 | Huang | 717/174 |
| 2007/0112979 A1* | 5/2007 | Peng | 710/8 |
| 2007/0113279 A1* | 5/2007 | Wang et al. | 726/20 |
| 2007/0169088 A1* | 7/2007 | Lambert et al. | 717/168 |
| 2008/0126742 A1* | 5/2008 | Shupak et al. | 711/217 |
| 2008/0244619 A1* | 10/2008 | Jeon et al. | 719/321 |
| 2009/0043923 A1* | 2/2009 | Guo | 710/33 |
| 2010/0050166 A1* | 2/2010 | Chiu et al. | 717/168 |
| 2010/0115201 A1* | 5/2010 | Hsu | 711/115 |
| 2010/0174902 A1* | 7/2010 | Wang | 713/165 |
| 2010/0243736 A1* | 9/2010 | Chou et al. | 235/385 |
| 2010/0287616 A1* | 11/2010 | Yang et al. | 726/24 |
| 2011/0055513 A1* | 3/2011 | Lee | 711/173 |
| 2011/0208929 A1* | 8/2011 | McCann | 717/174 |
| 2011/0252209 A1* | 10/2011 | Lee | 711/163 |
| 2012/0240230 A1* | 9/2012 | Lee | 726/24 |
| 2012/0297376 A1* | 11/2012 | Bird | 717/174 |

FOREIGN PATENT DOCUMENTS

| | | |
|---|---|---|
| JP | 2004151785 | 5/2004 |
| TW | I226609 | 1/2005 |
| TW | I283347 | 7/2007 |
| TW | I292125 | 1/2008 |
| TW | 200917256 | 4/2009 |

OTHER PUBLICATIONS

Rodes et al., "Security Analysis of a Fingerprint-protected USB Drive", 2010 ACM, ACSAC'10 10 Dec. 6-10, 2010, Austin, Texas USA, pp. 89-96; <http://dl.acm.org/citation.cfm?doid=1920261.1920275>.*

Patrick Nelson, "Run Your Software From a USB Stick for Security and Speed", Apr. 12, 2012, TechNewsWorld, pp. 1-1; <http://www.technewsworld.com/story/74846.html>.*

"Office Action of Japan Counterpart Application", issued on Jul. 31, 2012, p. 1-p. 2.

"First Office Action of China counterpart application" issued on Jul. 26, 2012, p. 1-p. 6.

"Office Action of Taiwan Counterpart Application", issued on Jun. 26, 2013, p. 1-p. 9.

* cited by examiner

METHOD AND SYSTEM FOR EXECUTING A FILE STORED IN A HIDDEN STORAGE AREA OF A STORAGE DEVICE

CROSS-REFERENCE TO RELATED APPLICATION

This application claims the priority benefit of Taiwan application serial no. 98121008, filed on Jun. 23, 2009. The entirety of the above-mentioned patent application is hereby incorporated by reference herein and made a part of specification.

BACKGROUND

1. Technology Field

The present invention generally relates to a file executing method and a file executing system, and more particularly, to a file executing method and a file executing system for executing a computer executable code set stored in a hidden storage area of a storage device.

2. Description of Related Art

Along with the widespread of digital cameras, cell phones, and MP3 in recently years, the consumers' demand to storage media has increased drastically. Flash memory is one of the most adaptable memories for such battery-powered portable products due to its characteristics such as data non-volatility, low power consumption, small volume, and non-mechanical structure. Additionally, portable storage devices have been broadly applied to the storage of digital contents along with the development of plug and play connection interfaces (for example, the universal serial bus (USB)).

A storage device manufacturer usually stores applications in the portable storage devices it manufactured to be used by users which buy these portable storage devices, so as to increase the market competitiveness of these portable storage devices. For example, the manufacturer may develop a disk management program for a portable storage device and stores the disk management program in the portable storage device, so that a user can use this disk management program to manage the portable storage device.

Presently, in order to allow a computer host to execute such an application provided by a storage device manufacturer, the application is stored in a partition (or storage area) for storing data regularly of the portable storage device to be accessed by the computer host. Because an application can be accessed by a computer host in a general file accessing manner, the application can be easily copied and distributed, and accordingly, the intellectual property of a developer of the application cannot be effectively protected. Even though the manufacturer of the portable storage device may allocate a hidden storage area (i.e., a storage area inaccessible to the computer hosts) in the portable storage device and store the application in the hidden storage area to prevent the application from being copied or distributed, since the application has to be executed by the operating system of the computer host, the user cannot use the application stored in the hidden storage area anymore. Thereby, a method for directly executing a computer executable code set stored in a hidden storage area is to be developed.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a file executing method for directly executing a computer executable code set stored in a hidden storage area of a storage device.

The present invention is directed to a file executing system for directly executing a computer executable code set stored in a hidden storage area of a storage device.

According to an exemplary embodiment of the present invention, a file executing method for executing a computer executable code set stored in a storage device in an operating system of a computer host is provided, wherein the storage device includes a general storage area and a hidden storage area, and the computer executable code set is stored in the hidden storage area. According to the present exemplary embodiment, the file executing method includes connecting the storage device to the computer host, wherein the computer host has a main memory. The file executing method also includes providing a loader for managing the computer executable code set stored in the hidden storage area. The file executing method further includes running the loader in the main memory, requesting the operating system to allocate a first address segment in the main memory to run the loader, loading the computer executable code set from the hidden storage area into the first address segment by using the loader, transforming the computer executable code set into an executable content for the operating system by using the loader and storing at least a part of the executable content into the first address segment, and establishing a derivative execution procedure by using the loader to execute the executable content.

According to an exemplary embodiment of the present invention, a file executing system for executing a computer executable code set stored in a storage device is provided, wherein the storage device includes a general storage area and a hidden storage area, and the computer executable code set is stored in the hidden storage area. According to the present exemplary embodiment, the file executing system includes a computer host and a loader. The computer host includes an operating system and a main memory. The loader is coupled or accessibly connected to the computer host and the storage device and has an application executing unit, wherein the application executing unit executes the computer executable code set stored in the hidden storage area. The operating system runs the loader and allocates a first address segment to run the loader in the main memory. The application executing unit loads the computer executable code set from the hidden storage area into the first address segment, transforms the computer executable code set into an executable content for the operating system, stores the executable content into the first address segment, and establishes a derivative execution procedure to execute the executable content.

According to an exemplary embodiment of the present invention, a file executing method for executing a computer executable code set stored in a storage device in an operating system of a computer host is provided, wherein the storage device includes a general storage area and a hidden storage area, and the computer executable code set is stored in the hidden storage area. The file executing method includes providing a loader to manage the computer executable code set stored in the hidden storage area. The file executing method also includes directly loading the computer executable code set from the hidden storage area into the computer host and transforming the computer executable code set into an executable content for the operating system by using the loader. The file executing method further includes copying and executing the executable content.

According to an exemplary embodiment of the present invention, a programmable storage device for recording a program code executable to a computer host is provided, wherein the computer host loads and executes the program code to accomplish the file executing method described above.

As described above, in exemplary embodiments of the present invention, a computer executable code set stored in a hidden storage area of a storage device can be directly executed, and the computer executable code set stored in the hidden storage area is protected from being copied and distributed.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
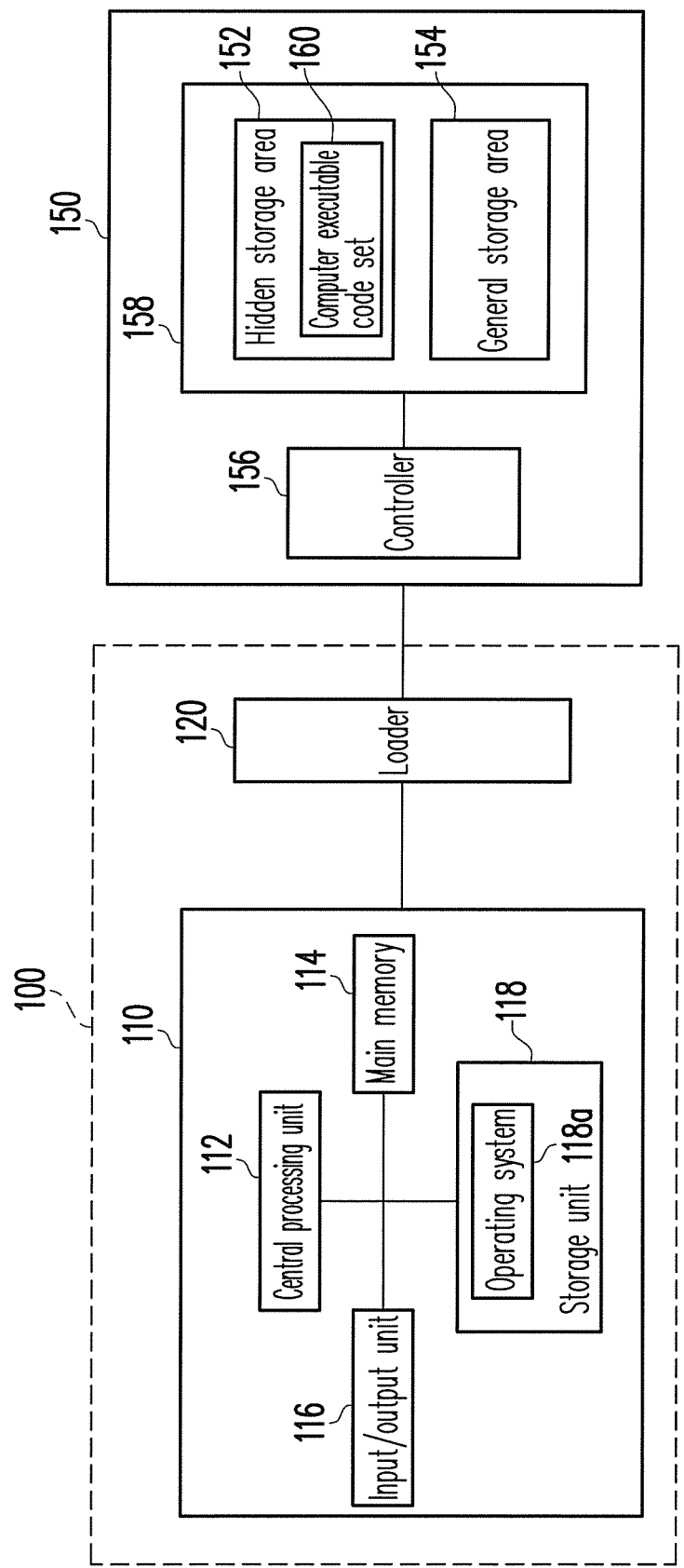
FIG. 1 is a schematic block diagram of a file executing system according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 is a schematic block diagram of a file executing system according to a first exemplary embodiment of the present invention.

Referring to FIG. 1, the file executing system 100 is capable of executing a computer executable code set 160 stored in the hidden storage area 152 of the storage device 150. To be specific, the storage device 150 includes a hidden storage area 152 and a general storage area 154, wherein the hidden storage area 152 is a storage area inaccessible to the operating system of a computer (i.e., the operating system of the computer cannot directly read data from or write data into the hidden storage area 152 through general programs), and the general storage area 154 is a storage area accessible to the operating system of the computer. In the present exemplary embodiment, the storage device 150 is a portable storage device (for example, a flash drive or a mobile hard disk) having a flash memory as its storage medium. For example, the storage device 150 includes a controller 156 and a flash memory chip 158. The controller 156 controls the operation of the entire storage device 150. The flash memory chip 158 includes the hidden storage area 152 and the general storage area 154 and is used for storing data and computer applications. However, the present invention is not limited thereto, and the storage device 150 may also be a magnetic tape, a floppy disk, an optical data storage device, or other storage devices. In addition, it should be mentioned that the controller 156 may further encrypt data or applications before storing the encrypted data or applications into the hidden storage area 152, so as to further protect the data or applications. Besides, related information of the computer executable code set 160 does not be displayed in the file allocation table (FAT) of the storage device 150. Namely, the operating system 118a does not recognize the computer executable code set 160 as a file.

The file executing system 100 includes a computer host 110 and a loader 120.

The computer host 110 is a platform for executing the computer executable code set 160. In the present exemplary embodiment, the computer host 110 is a desktop personal computer. However, the present invention is not limited thereto. In another exemplary embodiment of the present invention, the computer host 110 may also be a notebook computer, a server, or any other computer host that can execute computer programs.

The computer host 110 includes a central processing unit 112, a main memory 114, an input/output unit 116, and a storage unit 118 storing the operating system 118a.

The central processing unit 112 explains computer commands and processes data in computer software.

The main memory 114 is coupled to the central processing unit 112 and used to load different programs and data to be executed and used by the central processing unit 112. To be specific, the main memory 114 can be read or written in real time and the access speed thereof is very fast. Accordingly, the main memory 114 is used as a temporary data storage medium by the operating system 118a or other programs that are currently executed. In the present exemplary embodiment, the main memory 114 is a dynamic random access memory (DRAM). In another exemplary embodiment of the present invention, the operating system may also use a virtual memory simulated in the storage space of the storage device as the temporary data storage medium for executing applications, and in this case, the main memory further includes the virtual memory.

The input/output unit 116 is coupled to the central processing unit 112 and served as an interface which allows a user to input data or commands into the computer host 110 or output data from the computer host 110. In the present exemplary embodiment, the input/output unit 116 includes a keyboard, a mouse, and a display (not shown).

The storage unit 118 is coupled to the central processing unit 112 and served as the main storage medium of the computer host 110. In the present exemplary embodiment, the storage unit 118 is a hard disk. However, the present invention is not limited thereto. The storage unit 118 stores the operating system 118a for managing computer hardware and computer software, and meanwhile, the operating system 118a is the core of the computer host 110. To be specific, the operating system 118a manages and allocates the main memory 114, determines the allocation priority of system resources (for example, the central processing unit 112, the main memory 114, and the input/output unit 116), controls the input/output unit 116, and manages the file system, etc. In the present exemplary embodiment, the operating system 118a is a windows system developed by MICROSOFT. However, the present invention is not limited thereto, and other operating systems may also be applied to the present invention.

The loader 120 is coupled to the computer host 110 or stored in the storage device 150, and which has a plurality of logic gates or control instructions implemented in a hardware or firmware/software form for managing an application (for example, the computer executable program 160) stored in the hidden storage area 152 of the storage device 150. To be specific, in the present exemplary embodiment, the loader 120 is provided by the manufacturer of the storage device 150, and which can access the data or application stored in the hidden storage area 152 according to the specification of the hidden storage area 152.

In the present exemplary embodiment, the control instructions of the loader 120 are implemented in a software form, and are pre-stored in the general storage area 154 of the storage device 150. Namely, when a user operates the computer host 110 to browse the storage device 150 connected to the computer host 110, the user can click at the loader 120 stored in the general storage area 154 to run the control instructions of the loader 120 in the operating system 118a, so as to access the hidden storage area 152. To be specific, the control instructions of the loader 120 send a predetermined instruction to the storage device 150 after they are run in the operating system 118a. After receiving this instruction, the storage device 150 reads a predetermined data from the hidden storage area 152. In another exemplary embodiment of the present invention, the loader 120 implemented in a software form may also be stored in an optical disk or a hard disk (not shown) of the computer host 110 so that the loader 120 can be run in the operating system 80 when a user clicks at it.

It should be mentioned that in another exemplary embodiment of the present invention, the loader 120 may also be implemented in the storage device 150 or the computer host 110 in a hardware form.

Figure 2:
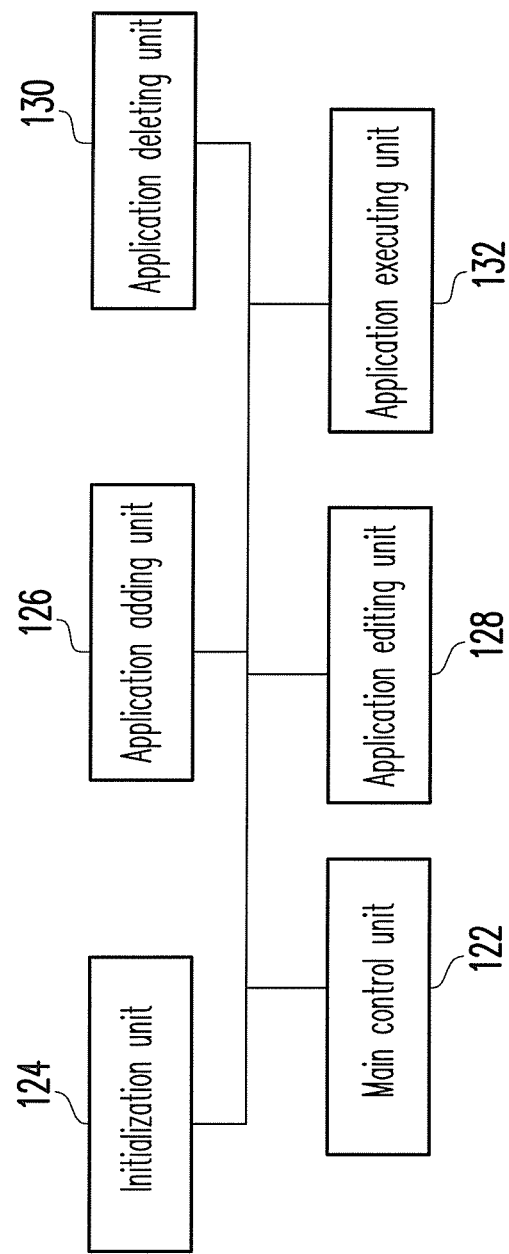
FIG. 2 is a schematic block diagram of a loader according to the first exemplary embodiment of the present invention.

FIG. 2 is a schematic block diagram of the loader 120 according to the first exemplary embodiment of the present invention.

Referring to FIG. 2, the loader 120 includes a main control unit 122, an initialization unit 124, an application adding unit 126, an application editing unit 128, an application deleting unit 130, and an application executing unit 132.

The main control unit 122 controls the operation of the entire loader 120.

The initialization unit 124 is coupled or linked to the main control unit 122 for initializing the hidden storage area 152 of the storage device 150. To be specific, when the initialization unit 124 is in operation, the initialization unit 124 verifies the address, size, and other information of the hidden storage area 152 and erases and formats the hidden storage area 152.

The application adding unit 126 is coupled or linked to the main control unit 122 for writing an application (for example, the computer executable code set 160) to be stored by a user into the hidden storage area 152.

The application editing unit 128 is coupled or linked to the main control unit 122 for editing an application list, so as to browse applications stored in the hidden storage area 152 of the storage device 150.

The application deleting unit 130 is coupled or linked to the main control unit 122 for deleting applications stored in the hidden storage area 152 of the storage device 150. For example, the application deleting unit 130 may delete the computer executable code set 160 from the hidden storage area 152.

The application executing unit 132 is coupled or linked to the main control unit 122 for executing applications stored in the hidden storage area 152 of the storage device 150. For example, the application executing unit 132 loads the computer executable code set 160 into the main memory 114 and executes the computer executable code set 160 in the operating system 118a of the computer host 110.

Figure 3:
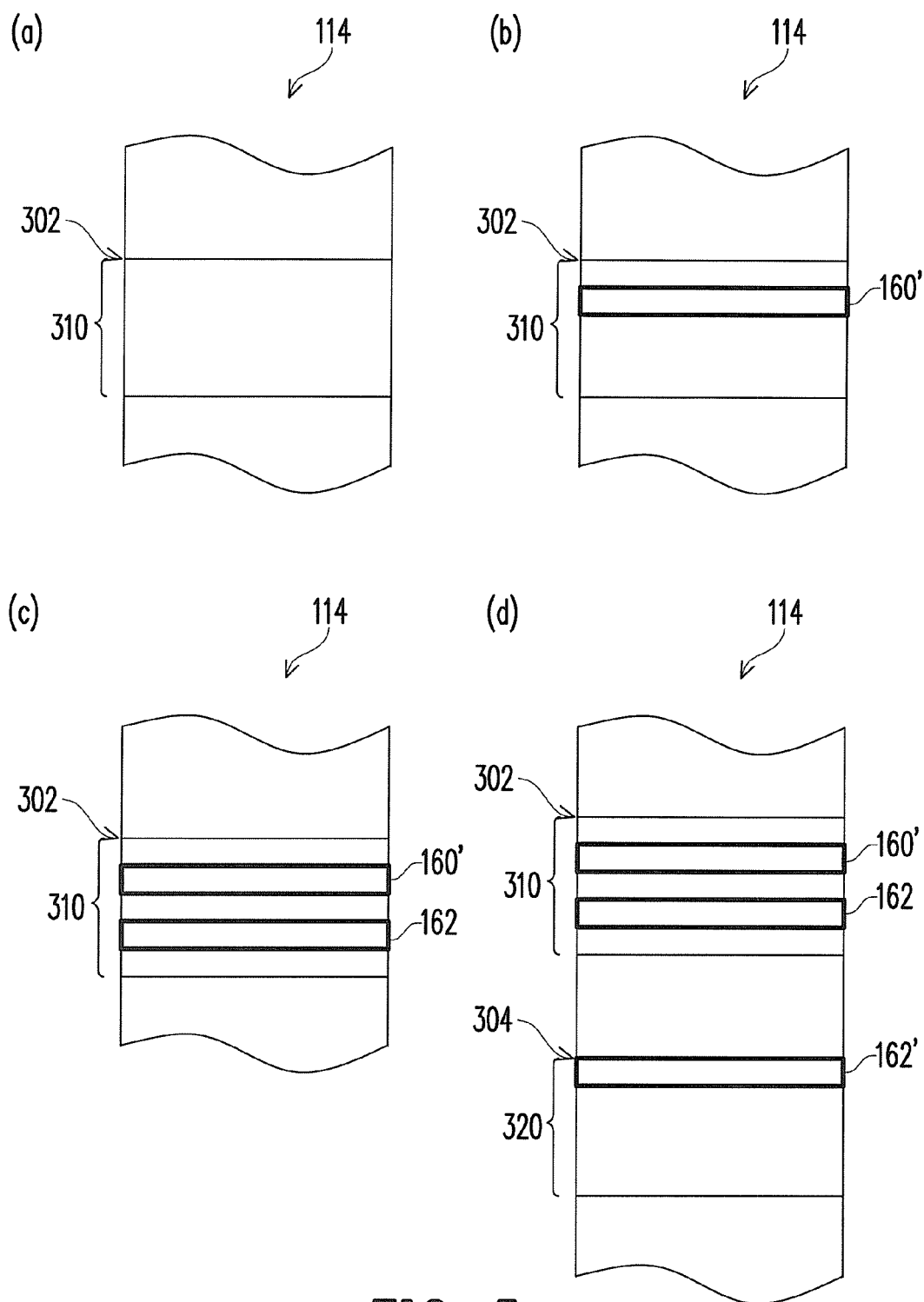
FIG. 3 illustrates the operation of a main memory when a loader is run to execute a computer executable code set stored in a hidden storage area according to the first exemplary embodiment of the present invention.

FIG. 3 illustrates the operation of a main memory when the loader 120 is run to execute the computer executable code set 160 in the hidden storage area 152 according to the first exemplary embodiment of the present invention.

Referring to FIG. 3, when a user operates the operating system 118a of the computer host 110 through the input/output unit 116 and clicks at the loader 120, the operating system 118a allocates an execution point 302 for executing the loader 120 and allocates a first address segment 310 with the execution point 302 as a starting point in the main memory 114 (as shown in FIG. 3(a)) for loading the control instructions of the loader 120 and temporarily storing data to be used while running the loader 120.

In addition, when the user executes the computer executable code set 160 stored in the hidden storage area 152 through the loader 120, the application executing unit 132 loads the computer executable code set 160 from the hidden storage area 152 to the first address segment 310 (as the computer executable code set 160' in FIG. 3(b)) and transforms the computer executable code set 160' into an executable content 162 of the operating system 118a. Meanwhile, the application executing unit 132 stores the executable content 162 into the first address segment 310 (as shown in FIG. 3(c)). In the present exemplary embodiment, the executable content 162 corresponding to the computer executable code set 160 is compatible to a portable executable (PE) file format of the Windows operating system.

In the present exemplary embodiment, the application executing unit 132 further requests an execution point 304 to execute a derivative execution procedure for re-running the loader 120 and a second address segment 320 for the derivative execution procedure from the operating system 118a. In the present exemplary embodiment, the derivative execution procedure re-runs the loader 120 through a fork process. However, the derivative execution procedure may also re-run the loader 120 through other multi-tasking execution processes, such as a multi-threading process. To be specific, the operating system 118a allocates a starting point (i.e., the execution point 304) for executing the derivative execution procedure and allocates the second address segment 320 for the derivative execution procedure in the main memory 114 (as shown in FIG. 3(d)) according to requests of the application executing unit 132. In particular, according to the present exemplary embodiment, the application executing unit 132 executes the executable content 162 corresponding to the computer executable code set 160 through the derivative execution procedure.

To be specific, after the application executing unit 132 executes the derivative execution procedure, it temporarily stops the execution of the derivative execution procedure, copies the executable content 162 corresponding to the computer executable code set 160 into the second address segment 320 starting from the execution point 304 (i.e., the executable content 162'), and then resumes the execution of the derivative execution procedure. Then, because the program code in the derivative execution procedure is replaced by the executable content 162' corresponding to the computer executable code set 160, the computer executable code set 160 is successfully executed by the computer host 110. To be specific, when the application executing unit 132 transforms the computer executable code set 160 into the executable content 162, it inserts information about the computer executable code set 160 (for example, the size of the program code) into the header of the executable content 162, so that the operating system 118a can correctly execute the corresponding program code when it executes the derivative execution procedure replaced by the executable content 162' starting from the execution point 304.

It should be mentioned that since the derivative execution procedure is used for re-running the loader 120, the second address segment 320 has the same size as the first address segment 310. In another exemplary embodiment of the present invention, the application executing unit 132 further determines whether the size of the second address segment 320 is enough for accommodating the executable content 162'. If the size of the second address segment 320 is smaller than the size of the executable content 162', the application executing unit 132 requests the operating system 118a to allocate a third address segment (not shown) in the main memory 114 to ensure that there is enough memory space in the main memory 114 for writing the executable content 162'.

Figure 4:
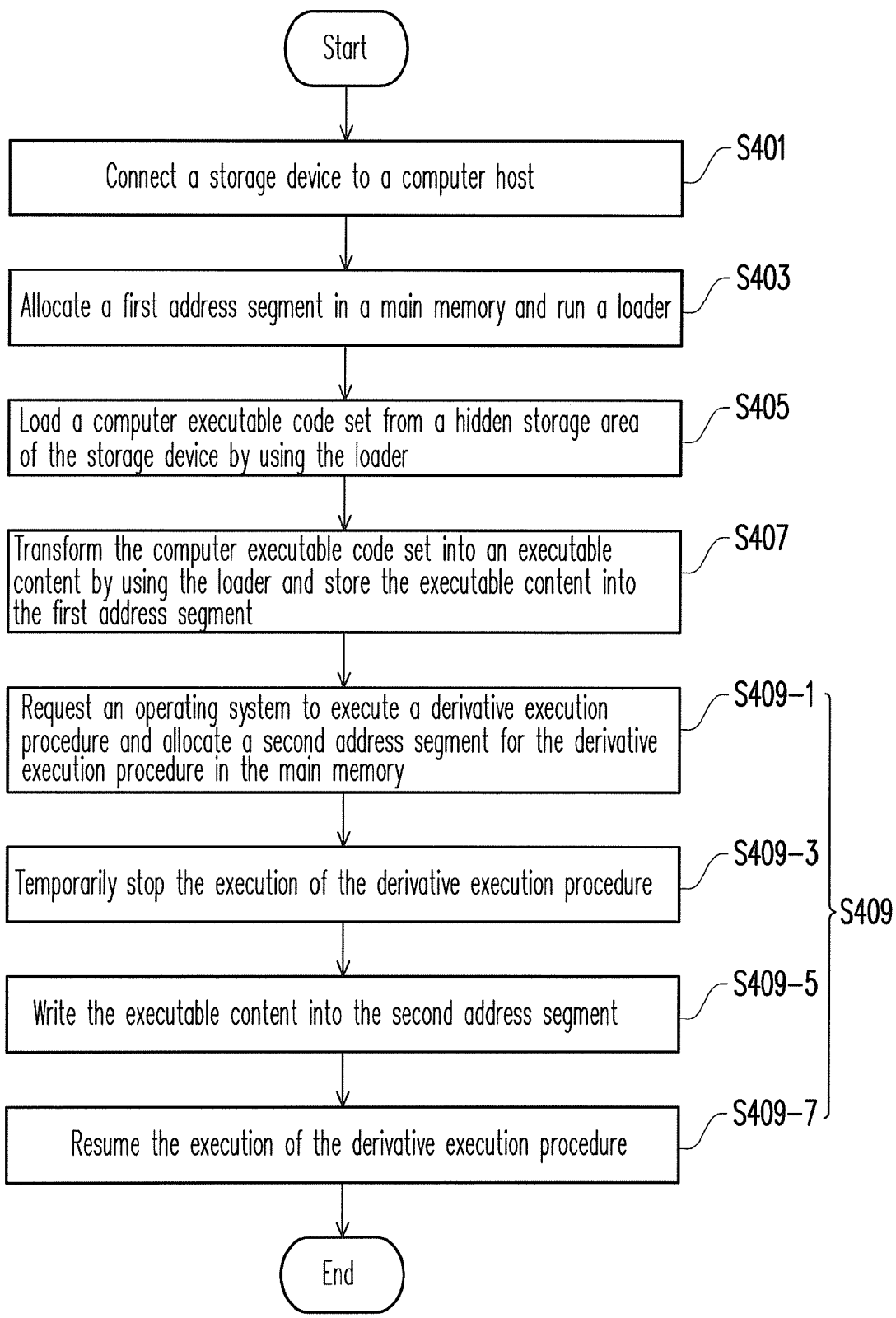
FIG. 4 is a flowchart of a file executing method according to the first exemplary embodiment of the present invention.

FIG. 4 is a flowchart of a file executing method according to the first exemplary embodiment of the present invention.

Referring to FIG. 4, first, in step S401, the storage device 150 is connected to the computer host 110, and in step S403, the first address segment 310 is allocated and the loader 120 is run in the main memory 114, wherein the running of the loader 120 has been described in detail above therefore will not be described herein.

Then, in step S405, the computer executable code set 160 is loaded by the loader 120 from the hidden storage area 152 of the storage device 150 into the first address segment 310 as a computer executable code set 160'. Next, in step S407, the computer executable code set 160' is transformed by the loader 120 into the executable content 162, and the executable content 162 is stored into the first address segment 310.

After that, in step S409, the executable content is executed by the loader 120. To be specific, in step S409-1, the operating system 118a is requested to execute a derivative execution procedure for re-running the loader 120 and allocate the second address segment 320 for the derivative execution procedure in the main memory 114. Next, in step S409-3, the execution of the derivative execution procedure is temporarily stopped by the loader 120, and in step S409-5, the executable content 162 is written into the second address segment 320 as an executable content 162'. Finally, in step S409-7, the execution of the derivative execution procedure is resumed.

As described above, in another exemplary embodiment of the present invention, step S409 further includes determining whether the size of the second address segment 320 is smaller than the size of the executable content 162' and requesting the operating system 118a to allocate a third address segment in the main memory 114 if the size of the second address segment 320 is smaller than the size of the executable content 162'.

Figure 5:
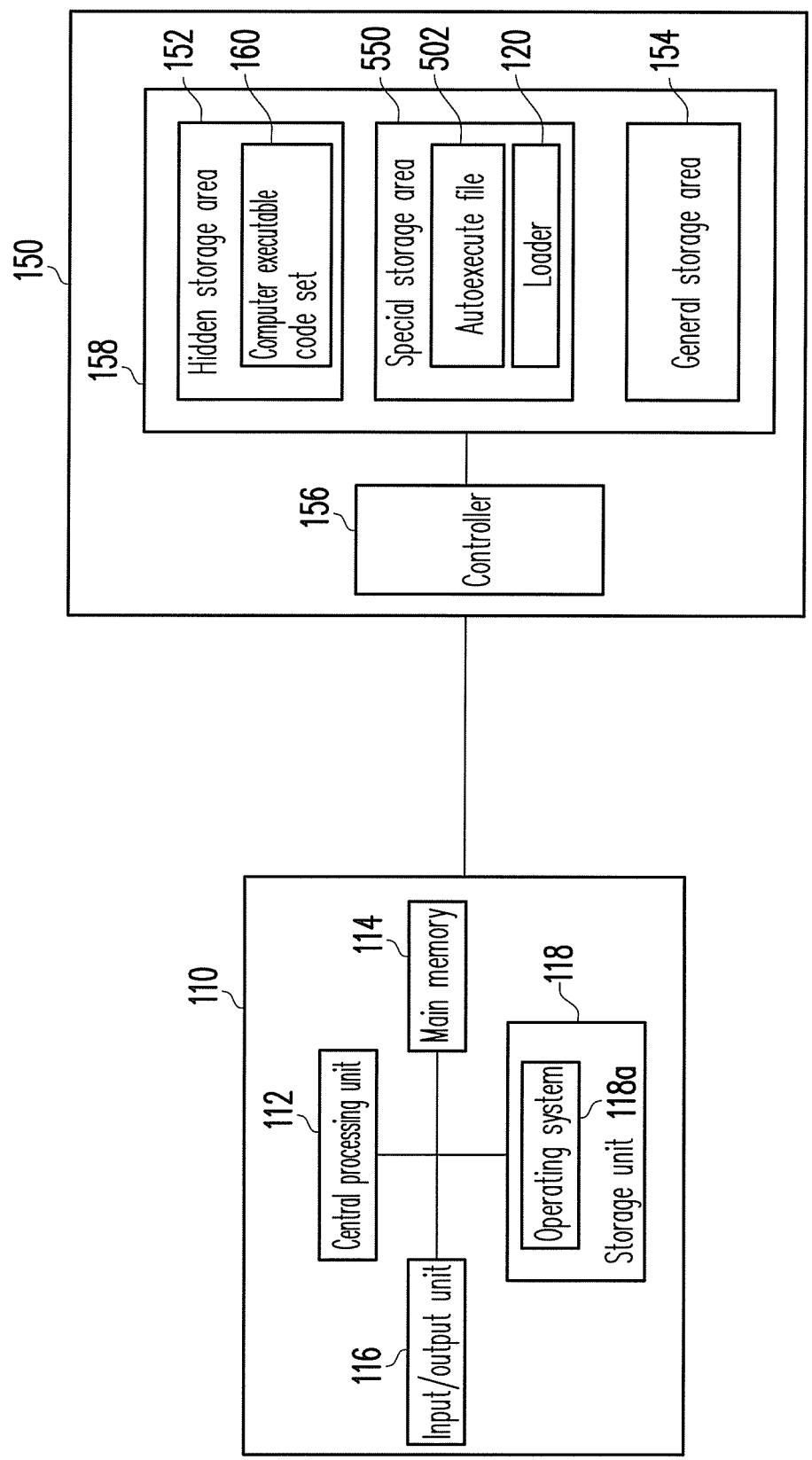
FIG. 5 is a schematic block diagram of a file executing system according to a second exemplary embodiment of the present invention.

FIG. 5 is a schematic block diagram of a file executing system according to a second exemplary embodiment of the present invention.

Referring to FIG. 5, the difference between the file executing system in the second exemplary embodiment and the file executing system in the first exemplary embodiment is that the file executing system in the second exemplary embodiment has an auto-execute file 502 for automatically executing the loader 120. To be specific, when the storage device 150 is coupled to the computer host 110, the auto-execute file 502 is automatically executed, and the auto-execute file 502 runs the loader 120 in the main memory 114. For example, in the present exemplary embodiment, the storage device 150 further includes a special storage area 550 compatible to the international standards organization (ISO) 9660 standard, wherein the special storage area 550 stores the auto-execute file 502 implemented as an autorun.inf and the loader 120. Thus, when the storage device 150 is coupled to the computer host 110, the operating system 118a automatically executes the auto-execute file 502 and accordingly runs the loader 120. In particular, a user can preset an application to be executed (for example, the computer executable code set 160) in the loader 120 so that the preset application is automatically executed when the loader 120 is run.

Figure 6:
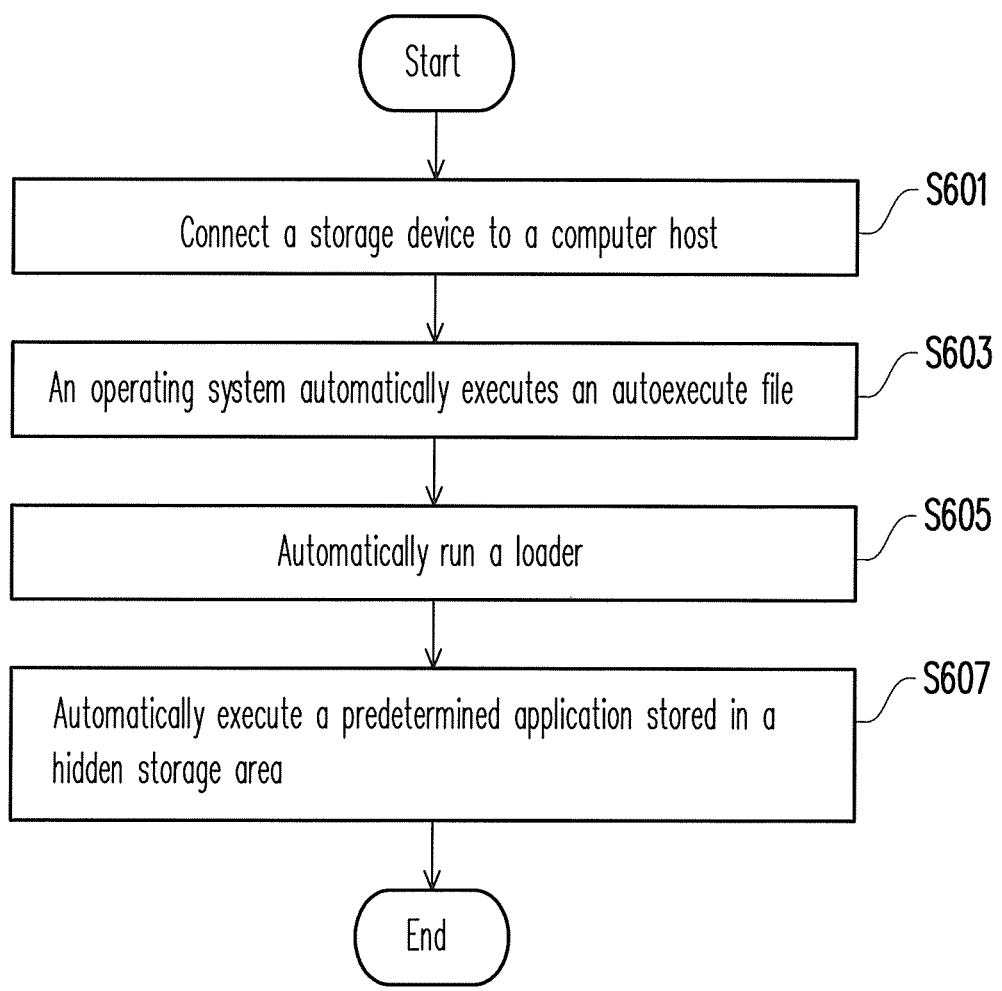
FIG. 6 is a flowchart of a file executing method according to the second exemplary embodiment of the present invention.

FIG. 6 is a flowchart of a file executing method according to the second exemplary embodiment of the present invention.

Referring to FIG. 6, first, in step S601, the storage device 150 is connected to the computer host 110, and in step S603, the operating system 118a automatically executes the auto-execute file 502. Next, in step S605, the loader 120 is automatically run, and in step S607, the preset application (for example, the computer executable code set 160) in the hidden storage area 152 is automatically executed, wherein the steps for executing the loader 120 and the application stored in the hidden storage area 152 are the same as the steps S403, S405, S407, S409-1, S409-3, S409-5, and S409-7 illustrated in FIG. 4 therefore will not be described herein.

In another exemplary embodiment of the present invention, the loader 120 is automatically shut down (i.e., the operation of the loader 120 is terminated) after it automatically runs the predetermined application.

The file executing method provided by the present invention can be implemented as a computer readable code in a computer readable recording medium (or a programmable storage device). The computer readable recording medium may be any data storage device that can be read by a computer system, such as a read-only memory (ROM), a random-access memory (RAM), a CD-ROM, a magnetic tape, a floppy disk, an optical data storage device, and a carrier wave (for example, data transmission through the Internet).

As described above, in the present invention, a loader is adopted to read a computer executable code set stored in the hidden storage area of a storage device, transform the computer executable code set into an executable content in the main memory of a computer host, and execute the executable content through a derivative execution procedure. Thereby, the previously described exemplary embodiments of the present invention have many advantages, including that the computer executable code set stored in the hidden storage area which is inaccessible to the computer host can be successfully executed in the computer host, and the computer executable code set stored in the hidden storage area is protected from being copied or distributed because the computer executable code set and the corresponding executable content are temporarily stored in the main memory in a non-file format, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A file executing method, for executing a computer executable code set stored in a storage device in an operating system of a computer host, wherein the storage device comprises a general storage area and a hidden storage area, and the computer executable code set is stored in the hidden storage area, the file executing method comprising:
   connecting the storage device to the computer host, wherein the computer host has a main memory;
   providing a loader to manage the computer executable code set stored in the hidden storage area;
   running the loader in the main memory;
   requesting the operating system to run the loader and to allocate a first address segment in the main memory for the loader;
   loading the computer executable code set from the hidden storage area into the first address segment by using the loader;
   transforming the computer executable code set into a executable content for the operating system by using the loader, and storing at least a part of the executable content into the first address segment; and
   establishing a derivative execution procedure by using the loader to execute the executable content.

2. The file executing method according to claim 1, wherein the step of establishing the derivative execution procedure by using the loader to execute the executable content comprises:
   requesting the operating system to execute the derivative execution procedure and allocate a second address segment for the derivative execution procedure in the main memory by using the loader, wherein the derivative execution procedure is used to re-run the loader;
   temporarily stopping the execution of the derivative execution procedure by using the loader;
   writing the executable content into the second address segment by using the loader; and
   resuming the execution of the derivative execution procedure by using the loader.

3. The file executing method according to claim 2, further comprising:
   determining whether the size of the second address segment is smaller than the size of the executable content by using the loader; and
   if the size of the second address segment is smaller than the size of the executable content, requesting the operating system to allocate a third address segment in the main memory by using the loader, wherein the size of the second address segment and the third address segment is greater than the size of the executable content.

4. The file executing method according to claim 1, further comprising:

configuring an auto-execute file in the storage device, wherein the auto-execute file runs the loader in the main memory; and
   automatically executing the auto-execute file by the operating system.

5. The file executing method according to claim 1, further comprising:
   configuring the loader in the general storage area of the storage device.

6. The file executing method according to claim 4, further comprising:
   allocating a special storage area in the storage device; and
   configuring the auto-execute file and the loader in the special storage area of the storage device, wherein the special storage area is compatible to an international standards organization (ISO) 9660 standard.

7. The file executing method according to claim 1, further comprising:
   configuring the loader in the computer host.

8. The file executing method according to claim 1, further comprising decrypting the computer executable code set.

9. The file executing method according to claim 1, further comprising initializing the hidden storage area by using the loader.

10. The file executing method according to claim 1, wherein the executable content is compatible to a portable executable file format.

11. The file executing method according to claim 1, further comprising:
    initializing the hidden storage area by using an initialization unit of the loader;
    writing the computer executable code set into the hidden storage area by using an application adding unit of the loader;
    editing a computer executable code set list to manage the computer executable code set stored in the hidden storage area by using an application editing unit of the loader;
    delete the computer executable code set from the hidden storage area by using an application deleting unit of the loader; and
    executing the computer executable code set by using an application executing unit of the loader.

12. A file executing system, for executing a computer executable code set stored in a storage device, wherein the storage device comprises a general storage area and a hidden storage area, and the computer executable code set is stored in the hidden storage area, the file executing system comprising:
    a computer host, having an operating system and a main memory; and
    a loader, coupled or accessibly connected to the computer host and the storage device, having an application executing unit, wherein the application executing unit is used to execute the computer executable code set stored in the hidden storage area,
    wherein the operating system runs the loader and allocates a first address segment for the loader in the main memory,
    wherein the application executing unit loads the computer executable code set from the hidden storage area into the first address segment, transforms the computer executable code set into an executable content for the operating system, and stores the executable content into the first address segment,
    wherein the application executing unit establishes a derivative execution procedure to execute the executable content.

13. The file executing system according to claim 12,
wherein the application executing unit requests the operating system to execute the derivative execution procedure and allocates a second address segment for the derivative execution procedure in the main memory, wherein the derivative execution procedure is used to re-run the loader,
wherein the application executing unit temporarily stops the execution of the derivative execution procedure, writes the executable content into the second address segment, and resumes the execution of the derivative execution procedure.

14. The file executing system according to claim 13, wherein the application executing unit determines whether the size of the second address segment is smaller than the size of the executable content, and
if the size of the second address segment is smaller than the size of the executable content, the application executing unit requests the operating system to allocate a third address segment in the main memory, wherein the size of the second address segment and the third address segment is greater than the size of the executable content.

15. The file executing system according to claim 12 further comprising an auto-execute file configured in the storage device,
wherein when the storage device is coupled to the computer host, the operating system automatically executes the auto-execute file, and the auto-execute file runs the loader in the main memory.

16. The file executing system according to claim 15, wherein the storage device further comprises a special storage area compatible to an international standards organization (ISO) 9660 standard,
wherein the auto-execute file and the loader are configured in the special storage area of the storage device.

17. The file executing system according to claim 12, wherein the loader is configured in the general storage area of the storage device.

18. The file executing system according to claim 12, wherein the loader comprises:
a main control unit;
an initialization unit, coupled to the main control unit and configured to initialize the hidden storage area;
an application adding unit, coupled to the main control unit and configured to write the computer executable code set into the hidden storage area by using of the loader;
an application editing unit, coupled to the main control unit and configured to edit a computer executable code set list to manage the computer executable code set stored in the hidden storage area; and
an application deleting unit, coupled to the main control unit and configured to delete the computer executable code set from the hidden storage area.

* * * * *